United States Patent [19]

Helmer et al.

[11] 4,213,229
[45] Jul. 22, 1980

[54] MECHANICAL DEBONING OF POULTRY

[75] Inventors: Warren D. Helmer, Lindenwold; Robert E. Small, Voorhees, both of N.J.

[73] Assignee: Campbell Soup Company, Camden, N.J.

[21] Appl. No.: 909,380

[22] Filed: May 25, 1978

[51] Int. Cl.² .................. A22C 21/00; A22C 17/04
[52] U.S. Cl. .................................. 17/46; 17/1 G; 17/11
[58] Field of Search ........... 17/44.1, 1 G, 46, 45, 17/11; 210/361, 362

[56] References Cited

U.S. PATENT DOCUMENTS

| | | | |
|---|---|---|---|
| 3,134,135 | 5/1964 | Harben, Jr. | 17/44.1 |
| 3,257,732 | 6/1966 | Webster | 210/361 X |
| 3,478,385 | 11/1969 | Kaplan | 17/46 |
| 3,896,522 | 7/1975 | Lapeyre | 17/1 G X |

Primary Examiner—Willie G. Abercrombie
Attorney, Agent, or Firm—Paul & Paul

[57] ABSTRACT

A method and apparatus for separating poultry meat from bone are disclosed, in which separation is accomplished through the use of centrifugal force. A poultry section is attached to a rotating member, and the high-speed rotation of said member, with controlled acceleration, causes the desired separation of meat from bone. The method taught is a dry method, and produces large chunks of meat, neatly and conveniently separated from the bone by centrifugal forces alone. Also disclosed is an apparatus which separates meat from bone of a plurality of carcasses in semi-automatic fashion. Poultry pieces, continuously attached to the apparatus by hand, are then automatically deboned by centrifugal force, and the meat recovered.

7 Claims, 12 Drawing Figures

MECHANICAL DEBONING OF POULTRY

BACKGROUND OF THE INVENTION

This invention discloses a mechanical means of separating poultry meat from bone, wherein the separation is accomplished by centrifugal force alone, without the need for numerous and substantial preparatory steps.

The use of centrifugal force in the food processing art has been known in the prior art, in several forms, for some time. For example, U.S. Pat. No. 3,017,661 to W. A. Zartman discloses the use of centrifugal force as an aid in delivering fragments of meat and bone after they have been separated by conventional impact methods. Note also that devices of the type taught by Zartman involve a wet process with meat and bone fragments floating in a container of water.

One means by which centrifugal force incidentally aids in the actual separation of meat from bone is illustrated in U.S. Pat. No. 3,748,385 to J. J. Kaplan. Kaplan discloses a carcass axially mounted on a rod. Rotational motion is imparted to the carcass by high-velocity fluid jets. The meat separates from the skeleton due to the combined effects of the impact force of the fluid jets and whatever centrifugal forces are developed from the spinning. Note, however, that centrifugal force plays only a partial role in this separation apparatus. Much of the separation is due to impact. Also, this process still involves wet components.

Although centrifugal force has been used in preparing poultry in the past, the devices disclosed in the prior art very often require substantial preparation of the carcass before processing. Some devices require that the carcass be cooked prior to separation. Other devices, although they use centrifugal force to a limited extent, rely principally on various types of cutting edges, and the like, to achieve the actual separation of the meat.

As mentioned above, many of the processes known in the prior art are wet processes. The use of water creates its own problems. When water is used, valuable protein and fat tend to be washed away, and some of the nutritional value of the meat is thereby lost. Also, applicable processing standards set a limit on the amount of moisture that meat may contain, and if too much water is absorbed by a piece of meat, it is necessary to employ some means to remove that water. This often requires the use of an oven or a blower, or even a blast freezer, to dry the meat sufficiently.

SUMMARY OF THE INVENTION

This invention solves the above-described problems with a new and useful apparatus for separation of meat from bone through the use of centrifugal force alone. In one embodiment of this invention, poultry sections are continuously attached to holders mounted on a plurality of moving trolleys. The trolleys hold one or more poultry sections, and when the trolleys move into the proper position, the holders rotate at high speed, up to 4000 rpm, and the resulting centrifugal force causes the meat to separate from the bone. The separated meat chunks are collected by a conveyor belt and removed from the apparatus.

In another embodiment of the present invention, poultry sections are processed in batches rather than continuously. A poultry section is mounted on a rotatable holder, and direct-drive rotation of the holder at high speeds causes the meat to separate from the bone. The motor used to rotate the holder is then disengaged and the meat and skeleton are removed automatically.

This invention can be used with either cooked or raw poultry. Raw poultry requires a greater centrifugal force to effect separation of meat from bone. There are also several simple preparatory steps that can be taken in using the apparatus described herein, namely the separation of sections from the body of the carcass, and the cutting of several tendons prior to the use of centrifugal force.

The centrifugal force experienced by each poultry section is a uniform force, felt substantially equally at all locations on the poultry section. Consequently, separation occurs in neat chunks, without substantial shredding of the meat itself.

It is therefore a primary object of this invention to provide an apparatus for separating poultry meat from bone through the use of centrifugal force alone.

It is a further object of this invention to provide an apparatus as described above, wherein the force experienced by a poultry section is uniform throughout that section.

It is a further object of this invention to provide an apparatus as described above, wherein meat is separated in large chunks from bone, without substantial shredding of the meat.

It is a further object of this invention to provide a apparatus for centrifugal separation of meat from bone, in either the cooked or the raw state.

It is a further object of the invention to provide an apparatus as described above, wherein the separation is accomplished semi-automatically with a plurality of continuously-fed carcasses.

It is a further object of this invention to provide an apparatus for separating meat from bone of a leg-thigh poultry section.

It is a further object of the present invention to provide apparatus for separating meat from bone of a breast section of poultry.

It is a further object of this invention to provide a dry method of separating poultry meat from bone in the cooked or raw state.

It is a further object of this invention to provide a method of separating of poultry meat from bone with a minimum of preparatory steps.

It is a further object of the invention to provide an apparatus for separating poultry meat from bone by centrifugal force, wherein the amount of centrifugal force experienced can be continuously varied.

It is a further object of the present invention to provide an apparatus for centrifugal separation of poultry meat from bone, wherein the separated meat is collected by gravity onto a collecting pan or belt.

Other objects and advantages of the present invention will be apparent to those skilled in the art from a reading of the following brief description of the drawings, the detailed description of the invention, and the appended claims.

DETAILED DESCRIPTION OF THE INVENTION

Figure 12:
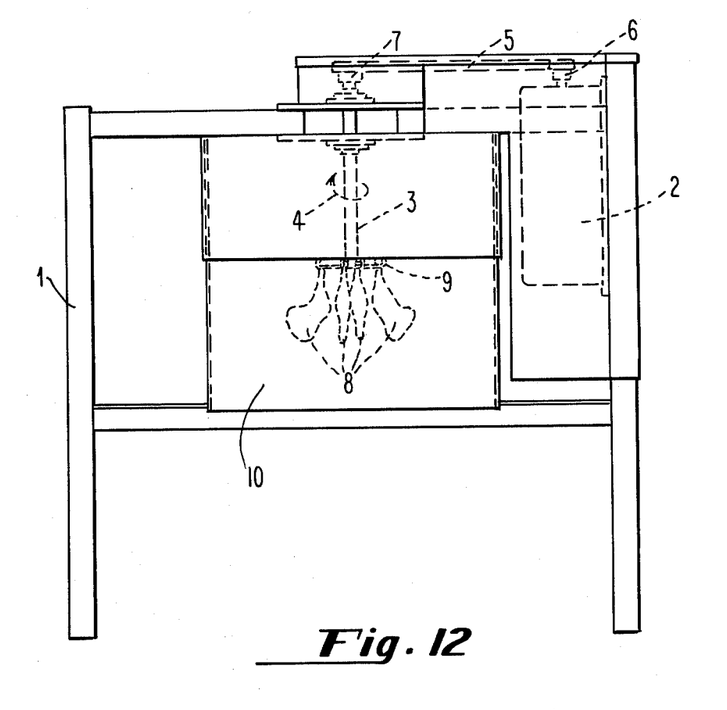
FIG. 12 is a front elevational view of a batch processing unit which embodies the basic principles of the present invention.

The operation of the present invention can best be understood with reference to the embodiment shown in FIG. 12. FIG. 12 illustrates a batch processing unit which accomplishes the mechanical separation of poultry meat from bone. Mounted on frame 1 is motor 2, which is connected by pulleys 6 and 7 and belt 5 to rod 3. Motor 2 therefore causes rod 3 to rotate in the direction indicated by arrow 4. Attached to rod 3 is poultry piece holder 9, to which are attached poultry pieces, indicated by the numerals 8. An enclosure 10 prevents pieces of meat from flying out in all directions. When the motor 2 is energized, rod 3 and poultry piece holder 9 begin to spin with a controlled acceleration, in the direction shown. If the poultry pieces 8 have been previously cooked, the thigh meat will separate from the bone when the speed of rotation is about 400 rpm; the leg meat will separate when the speed of rotation is about 900 rpm; any residual meat will separate at about 1100 rpm. This separation occurs almost instantaneously. There is no need to maintain the high speed of rotation for an appreciable length of time. A variable resistance means (not shown) can be used to control the speed and acceleration of motor 2, thereby regulating the amount and rate of increase of centrifugal force. It is desirable to accelerate the holder 9 at rates in the range of one to 40 radians per second per second. A controlled acceleration tends to prevent portions of a poultry piece from snapping off or shattering before having been deboned by the apparatus. If the poultry pieces have not been cooked, higher speeds of rotation are necessary to accomplish the same result. In the latter case, it would be necessary to provide a motor which can generate speeds of rotation of up to about 4000 rpm. Whether the meat is precooked or not, the separation occurs without the use of water or other fluids, and the meat separates in neat chunks. Separation occurs due solely to centrifugal forces which pull substantially uniformly on all portions of each poultry piece. Thus there is little or no shredding of meat. Enclosure 10 prevents pieces of meat from being scattered, and permits the separated chunks to drop into a pan or other collection device below (not shown). The bones remaining on holder 9 would then be removed, and a new set of poultry pieces would be attached, and the process repeated.

For best results, the tendons of the leg-thigh poultry piece are cut and the skin removed before placing the piece in the apparatus. If a breast section is to be deboned, it is desirable to cut the section along the keelbone and the wishbone, and then to remove the skin.

Figure 1:
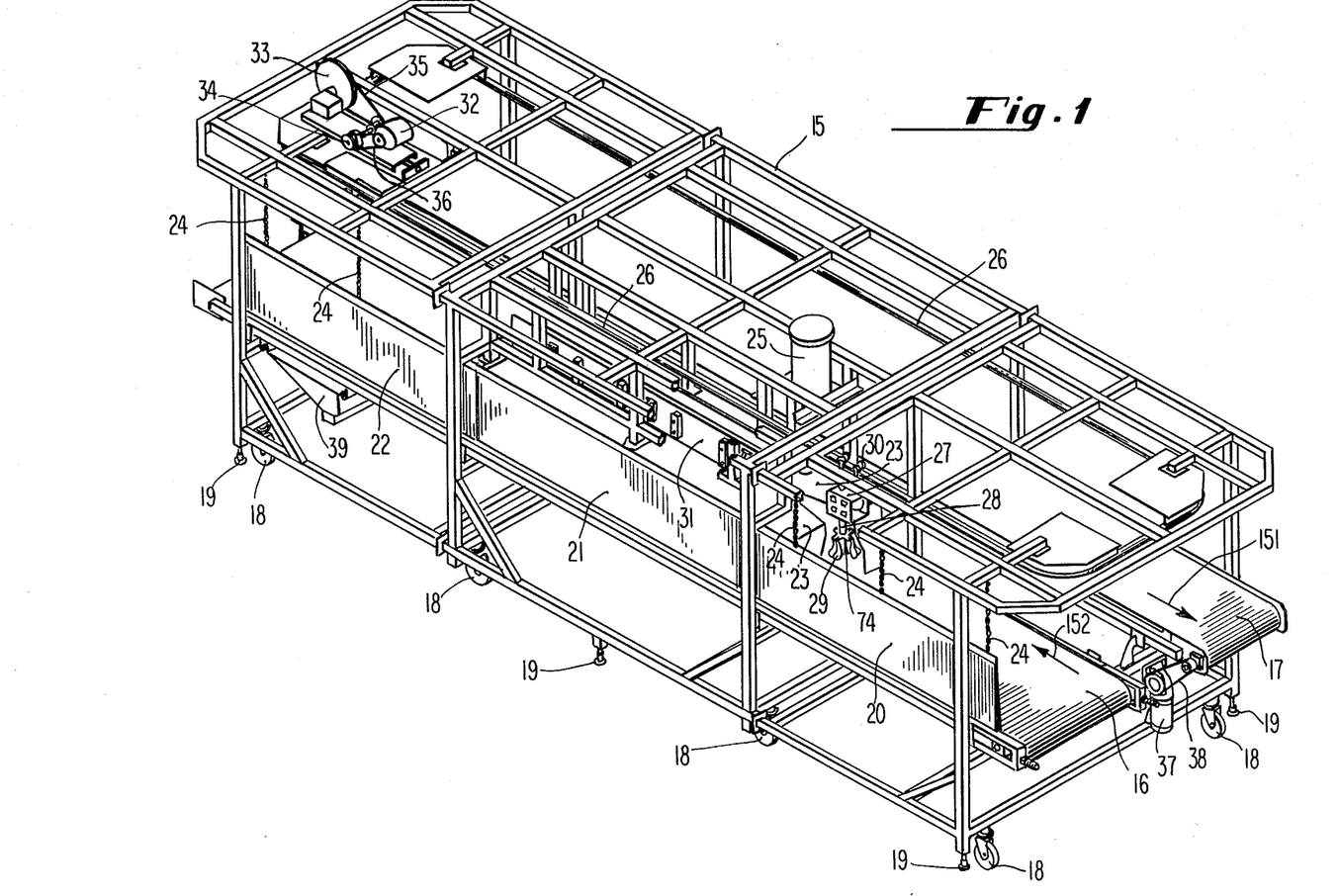
FIG. 1 is a simplified perspective view of the preferred embodiment of the present invention.

While the embodiment illustrated in FIG. 12 accomplishes the primary object of this invention, it has the disadvantage that only one set of poultry pieces can be processed at one time. The preferred embodiment, however, enables the objects of the present invention to be accomplished in a continuous manner, with many of the necessary steps being performed automatically. A perspective view of this preferred embodiment is illustrated in FIG. 1. This illustration is partially simplified, some of the details having been omitted for the sake of clarity; such details are shown in other drawings to be described presently. The apparatus shown in FIG. 1 comprises a frame 15 which rests on wheels 18 and feet 19. Conveyor belts 16 and 17 transport poultry pieces to their appropriate destinations. Conveyor belt 17 is located on the "input" side of the apparatus, and it is this belt that transports whole poultry pieces to operators who may stand along the side of the apparatus, and who can then attach said poultry pieces to the poultry piece holder to be described below. It is to be noted that conveyor belt 17 transports poultry pieces in the right-hand direction, as indicated by arrow 151. Conveyor belt 16 is shown moving in the direction indicated by arrow 152, but could also move in the opposite direction. Belt 16 delivers separated chunks of meat to a collecting means, not shown, such as a collecting pan or another conveyor belt. Drain 39 collects waste water from a washing spray (not shown) located at the underside of belt 16. The washing spray keeps the belt clean, but plays no part in separating meat from bone. It should be emphasized that the meat remains dry during the separation process. Sidewalls 20, 21, and 22 are suspended from frame 15 by chains 24, and said sidewalls, which are made of a resilient material such as rubber, together with overhead and end wall enclosures 23, prevent stray pieces of meat from flying out of the apparatus and cushion the impact of meat and occasional bones which separate from the holder 74 (which is described below). High-speed motor 25 provides the rotational speed necessary for cenfrifugal separation. Trolley 27, riding on track 26, comprises rod 28, connected to a poultry piece holder 74, to which poultry pieces 29 are attached. Trolley 27 rides on track 26 by means of rollers 30. Although only one trolley assembly is shown in FIG. 1, it is understood that a plurality of such trolleys would be used in the preferred embodiment. In fact, in the preferred embodiment, there would be 24 trolleys riding around track 26, and each of said trolleys would be at a different location, and consequently would represent a different stage of the process disclosed herein. Trolleys that were located over conveyor belt 17 would be those trolleys being loaded with poultry pieces. Trolleys arriving at the location over conveyor belt 16 would automatically engage the means for achieving rotation and centrifugal separation, and then come in contact with means for decelerating the spinning elements, and would then proceed through the automatic bone-removal area before returning to the initial loading area over conveyor belt 17.

High-speed rotation of the poultry piece holder 74 is accomplished by pressing trolley 27 against a rapidly moving belt, not shown in FIG. 1, said belt receiving its motion from motor 25. Trolley 27 is held firmly against the belt (not shown) by a drive tensioner assembly 31, which comprises an elongated flat bar which is spring loaded, and which holds trolley 27 against the rotation-generating belt. Motion of trolley 27 along track 26 is accomplished by motor 32, and pulleys 33 and 34, and belts 35, and 36, and a sprocket system to be described below. All trolleys 27 are linked together by a chain, not shown in FIG. 1, and the entire assembly forms a closed loop which keeps all trolleys 27 moving around track 26. Motion for the conveyor belt 17 is provided by motor 37 and belt 38; a similar motor and belt combination is provided for conveyor belt 16, but is not visible in the view of FIG. 1

Figure 2:
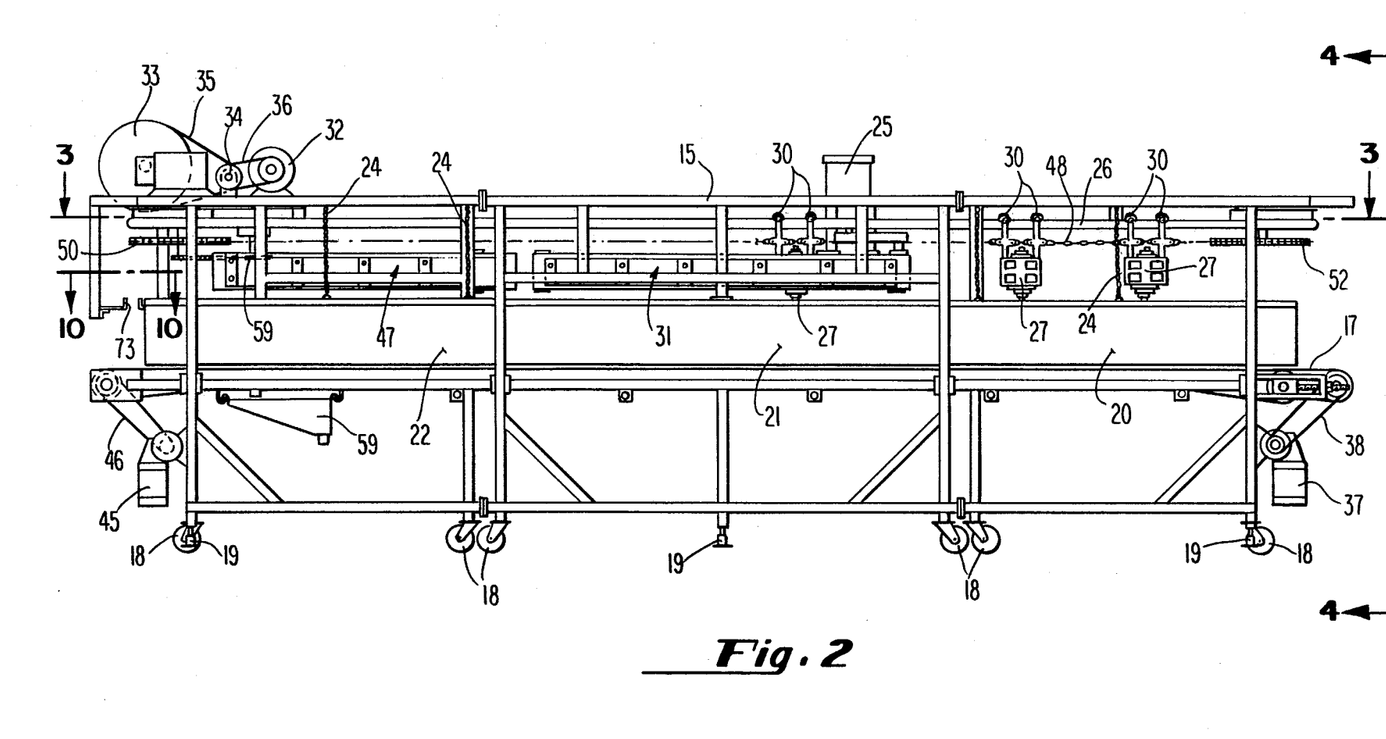
FIG. 2 is a view of the preferred embodiment, taken in side elevation.

The apparatus described herein is further illustrated in the elevational view of FIG. 2. In this figure, three trolleys 27 are shown, and it is seen that said trolleys are linked together by chain 48. Chain 48 mates with sprockets 50 and 52 (and two more sprockets, not shown in the view of FIG. 2), and the entire plurality of trolleys is thereby moved around track 26. FIG. 2 also shows more clearly both motors for imparting motion to the conveyor belts. Motor 45 and belt 46 provide motion for conveyor belt 16, and motor 37 and belt 38 are shown in FIG. 1. FIG. 2 shows more clearly the drive tensioner assembly 31, which presses trolleys 27 against a fast-moving belt (not shown) turned by motor 25, causing the poultry piece holders (not shown in FIG. 2) to spin. Also shown in FIG. 2 is deceleration tensioner assembly 47, not specifically shown in FIG. 1 for the sake of clarity, which performs a function similar to that of drive tensioner assembly 31, but which aids in decelerating the spinning member of trolley 27. Deceleration tensioner 47 comprises an elongated plate which presses trolley 27 against a more slowly moving belt, not shown in FIG. 2, which provides gradual deceleration of the spinning element.

Figure 3:
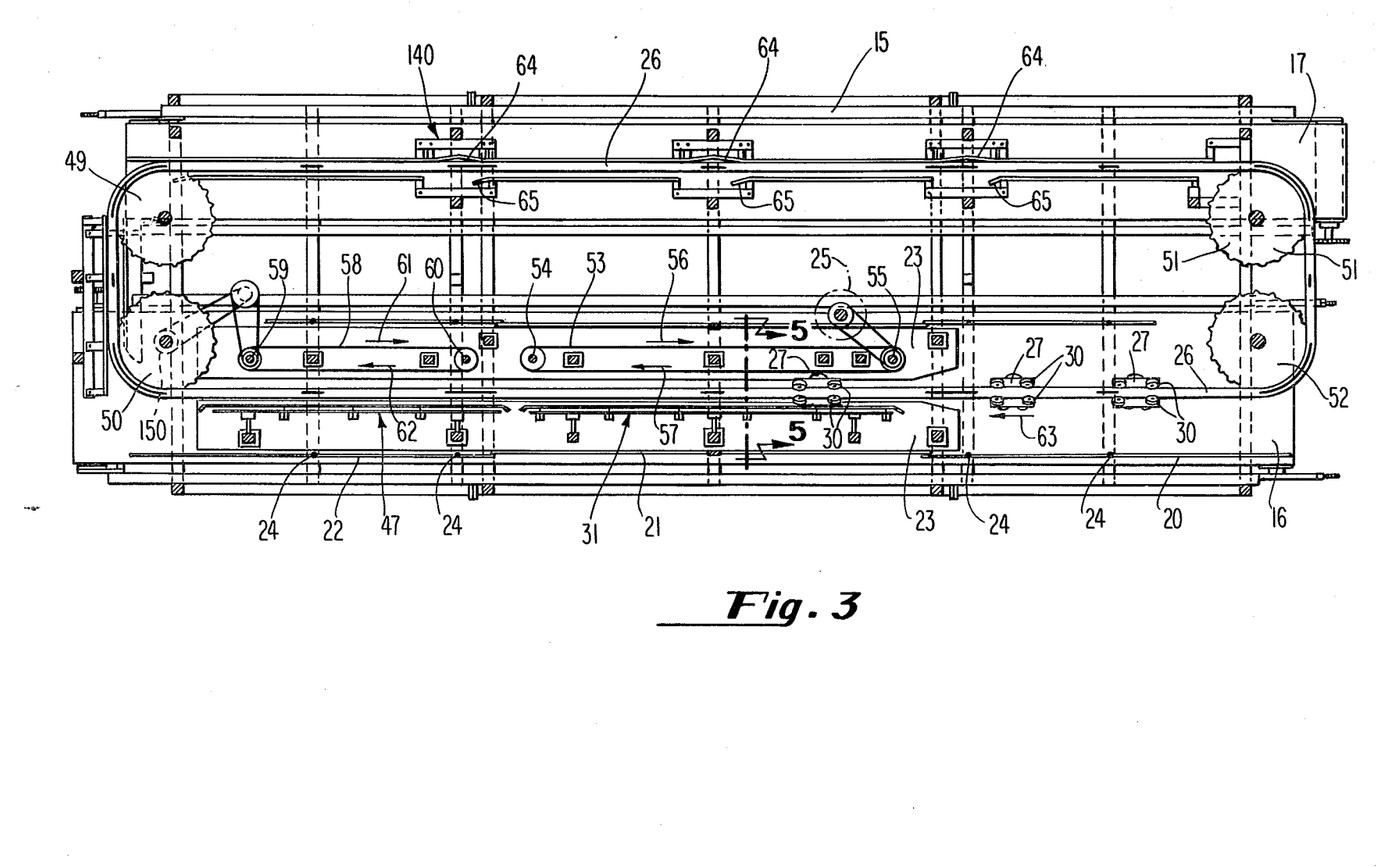
FIG. 3 is a cross-sectional view of the preferred embodiment, taken along the line 3—3 of FIG. 2.

FIG. 3 is a cross-sectional view taken along the line 3—3 of FIG. 2, but FIG. 3 could also be interpreted as a top view of the apparatus, taken after the top members of the apparatus have been removed. Sprockets 49, 50, 51, and 52 are more clearly visible in this figure, and it is seen that said sprockets can engage the chain, not shown in FIG. 3, which causes trolley 27 to ride around track 26. The input side of the machine, which is the upper portion of FIG. 3, and which corresponds to conveyor belt 17, contains a plurality of extensions 64 and protrusions 65, said extensions and protrusions comprising means for automatically turning a poultry piece holder (not shown in FIG. 3) in order to facilitate the loading of poultry pieces thereon. As will be described in more detail below, it is desired that after a poultry piece is attached to the holder, an empty hook should be presented to the operator at the next loading station. Extensions and protrusions 64 and 65 insure that once a poultry piece has been attached, the poultry piece holder will experience a 90° rotation such that an empty hook will face the operator as desired.

FIG. 3 also shows the high-speed belt 53 mounted on pulleys 54 and 55, and receiving rotational motion from high-speed motor 25. Belt 53 moves in the direction illustrated by arrows 56 and 57. Drive tensioner assembly 31 causes trolley 27 to be pushed against belt 53, so that when trolleys 27 enter the region spanned by belt 53, spinning is accomplished, and centrifugal separation of meat from bone occurs. Deceleration belt 58 is also shown, and said belt moves in the direction illustrated by arrows 61 and 62. Belt 58 is mounted around pulleys 59 and 60, and receives its motion from a small sprocket 150 which is connected to sprocket 50. Thus, belt 58 moves at a speed considerably slower than that of high-speed belt 53. When trolleys 27, being moved in the direction shown by arrow 63 around track 26 encounter the area spanned by belt 58, the trolleys are pushed against belt 58 by deceleration tensioner assembly 47, and the engagement with belt 58 causes deceleration with less friction than would be felt if belt 58 were not moving.

Figure 4:
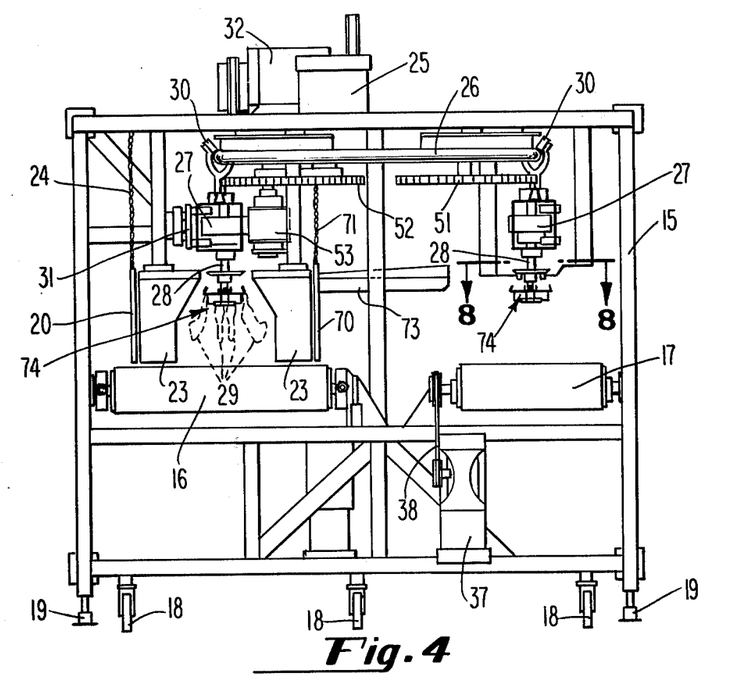
FIG. 4 is an end view of the preferred embodiment, taken along the line 4—4 of FIG. 2.

FIG. 4 is an end view of the apparatus, and clearly illustrates several details not visible in the preceding figures. The means by which particles of meat are contained is more clearly illustrated. Sidewall 70 is suspended from frame 15 by chain 71, similar to the combination of sidewall 20 and chain 24. Both overhead and end wall enclosures 23 are more plainly visible. Incline 73, located at the opposite end of the apparatus provides a cam action which causes automatic removal of separated skeletons after processing, as will be described more fully below. Trolley 27, together with poultry piece holder 74 is better illustrated in FIG. 4 as well.

Figure 5:
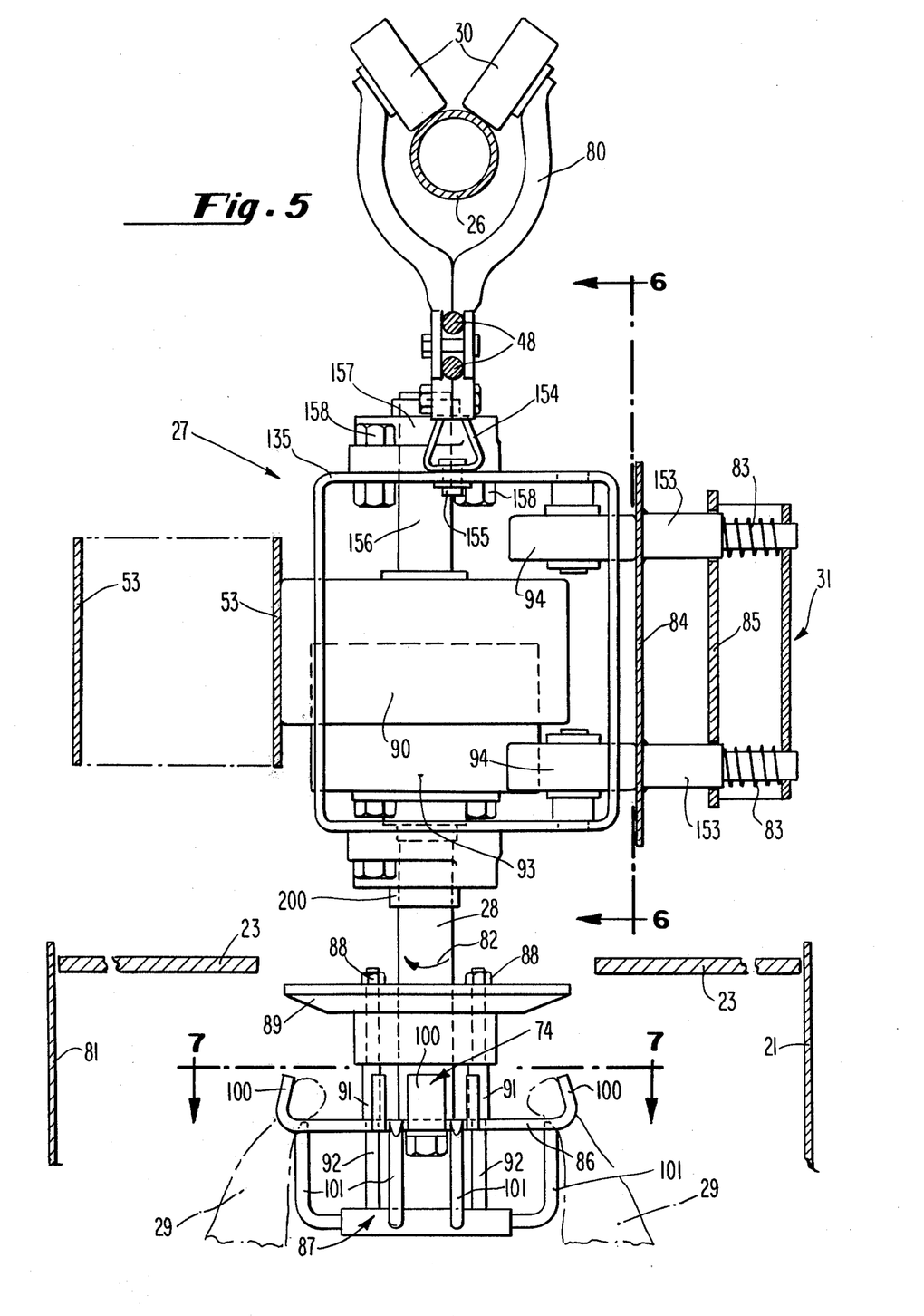
FIG. 5 is a cross-sectional view, taken along the line 5—5 of FIG. 3, and showing a trolley and a cross-sectional view of the drive tensioner assembly.

FIG. 5 shows in more complete detail the trolley 27 and poultry piece holder 74. Trolley 27 is attached to rollers 30 riding on track 26, by means of stirrup 80. Carried by trolley frame 135 are drive tensioner engaging rollers 94 which are engaged by and are passed by plate 84, said plate being spring-biased by spring 83. Plate 85 is stationary, and provides channels for sliding piston means 153. Located within trolley frame 135 is drive belt engaging roller 90, which is urged against high-speed belt 53, in response to the force exerted by drive tensioner assembly 31 through plate 84 on rollers 94.

Trolley frame 135 is connected to stirrup 80 by means of second stirrup 154 and bolt means 155. Shaft 156 is mounted in bearing 157, which bearing is affixed to frame 135 by attaching means 158. Shaft 156 is free to rotate, relative to frame 135. Roller 90 is rigidly affixed to shaft 156. Rotation of belt 53 is transmitted to drive belt engaging roller 90, and then to rod 28, through clutch means 93. The clutch means, in the preferred embodiment, is of the magnetic type, which is known in the art, and prevents unduly rapid and harmful acceleration. The clutch means could be of any other construction which permits controlled acceleration. Rod 28 is supported by bearing 200. Rotation of rod 28 occurs in the direction indicated by arrow 82. Poultry piece holder 74 comprises poultry piece hook plate 86 and bone-removal pusher prong assembly 87. Bone-removal pusher prong assembly 87 is attached to support plate 89 by nut 88, and comprises stops 91 which rest on hook plate 86. Poultry pieces 29 are attached to poultry piece hook plate 86 by the hooks 100 which are integrally attached to plate 86. Bone-removal pusher prong assembly 87 comprises bone-removing pusher prongs 101 and sliding post members 92. The functions of these latter elements will be described below. The entire poultry piece holder 74 of trolley 27 is shown enclosed by sidewalls 21 and 81 and overhead and end enclosures 23, shown in cross section. It is entire holder 74, as well as rod 28 and roller 90, which rotate relative to frame 135.

Figure 6:
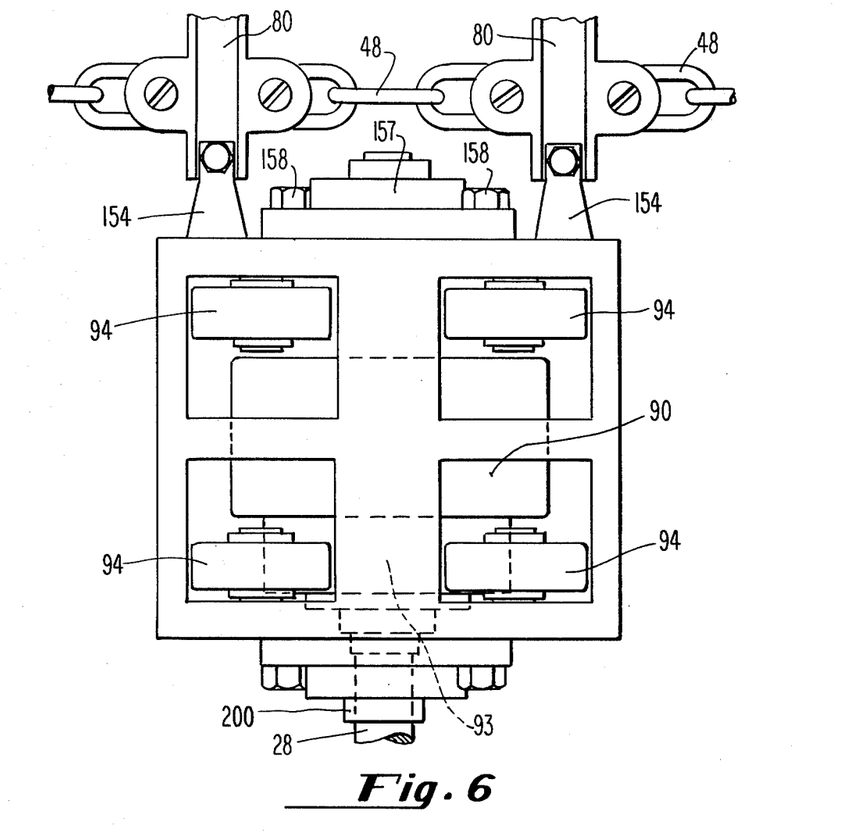
FIG. 6 is a view of a trolley, taken along the line 6—6 of FIG. 5.

The structure of the upper portion trolley 27 is illustrated in the view of FIG. 6. It is seen that each trolley has four drive tensioner engaging rollers 94 and one drive belt engaging roller 90. Chain 48 connecting trolley 27 is also shown, and fragments of stirrups 80 are also visible.

Figure 7:
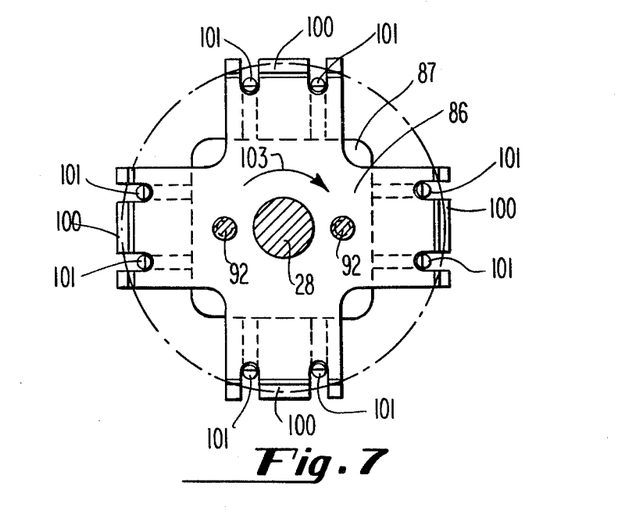
FIG. 7 is a cross-sectional view taken along the line 7—7 of FIG. 5, showing a poultry piece hook assembly.

The structure of poultry piece hook plate is further illustrated in FIG. 7. Plate 86 comprises hooks 100 integrally formed from said plate. Any other suitable hook means could be used, however. Protruding through recesses in hook plate 86 are bone-removing pusher prongs 101. The sliding post members 92 are shown, together with rod 28, which imparts rotational motion to plate 86. The entire plate 86 rotates in the direction indicated by arrow 103.

Figure 8:
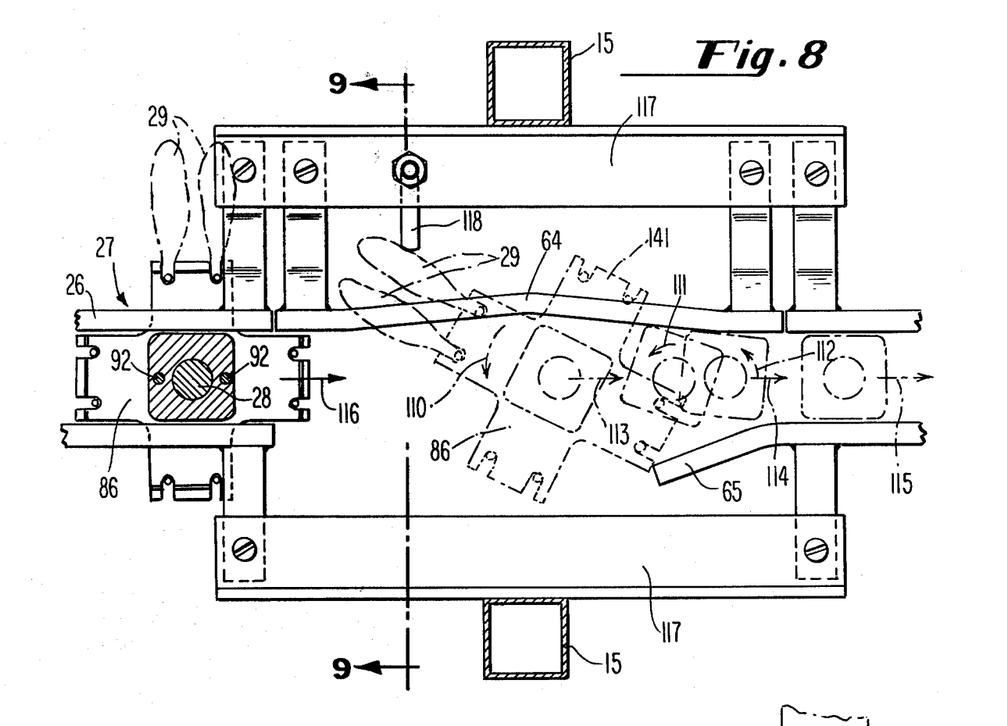
FIG. 8 is a cross-sectional view of a trolley, taken along the line 8—8 of FIG. 4, and also along the line 8—8 of FIG. 9, illustrating the automatic rotation of a poultry piece holder.

FIG. 8 is a detail of the section of the apparatus indicated by reference numeral 140 of FIG. 3. FIG. 8 is also a view taken along the line 8—8 of FIG. 9. In FIG. 8, there is shown, by means of phantom drawing, the motion of a trolley 27 which is moving along the input side of the apparatus, that is, the side located over conveyor belt 17. As shown in FIG. 8, trolley 27 is pulled along track 26 in the direction indicated by arrow 116. As trolley 27 proceeds, poultry piece 29 encounters catch 118 mounted on support 117 and plate 86 is therefore rotated in the direction indicated by arrow 110, while at the same time proceeding linearly in the direction indicated by arrow 113. Extension 64 and protrusion 65 permit the 90° rotation of trolley 27 as indicated by arrows 111 and 112, at the same time that the trolley 27 proceeds in the linear direction indicated by arrows 114 and 115. Extensions 64 and protrusions 65 are so designed and located to create sufficient space for the plate 86 to make the desired 90° turn. Of course, if there is no poultry piece 29 to engage catch 118, trolley 27 would not rotate. But if there is a poultry piece 29 attached to trolley 27, the rotation will cause an empty poultry piece hook, such as that indicated by reference numeral 141 to appear on the outer portion of the apparatus, making it easy to attach a second poultry piece to this vacant hook.

Figure 9:
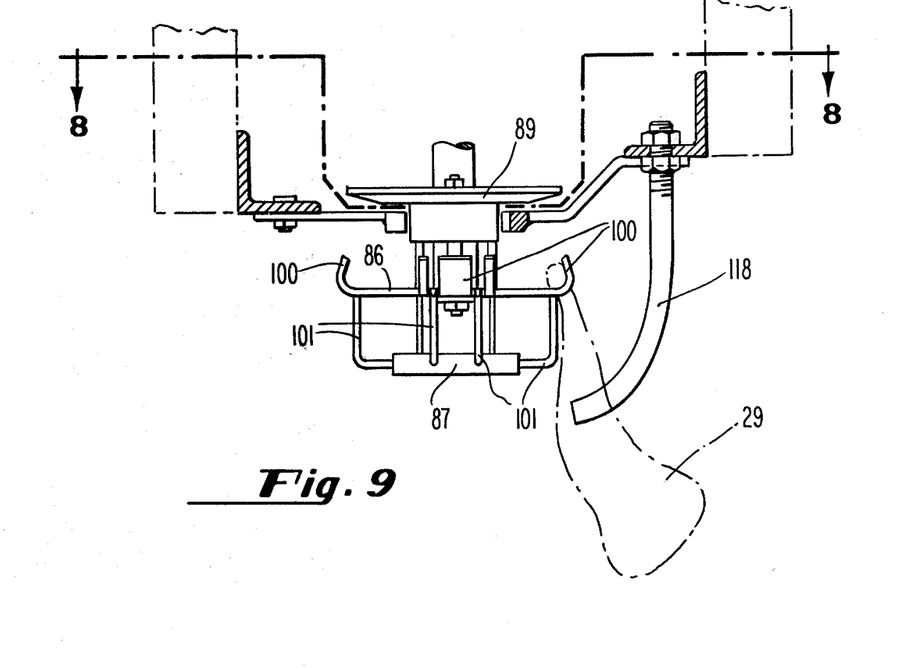
FIG. 9 is a cross-sectional view taken along the line 9—9 of FIG. 8, further illustrating the means by which a poultry piece holder is rotated.

The means by which the rotation of the trolley 27 is accomplished is clearly illustrated in FIG. 9, taken along the line 9—9 of FIG. 8. The shape of catch 118 is more clearly illustrated, as it engages poultry piece 29, causing the 90° rotation. Plate 86 is then prevented from further rotation by extensions and protrusions 64 and 65.

Figures 10, 11:
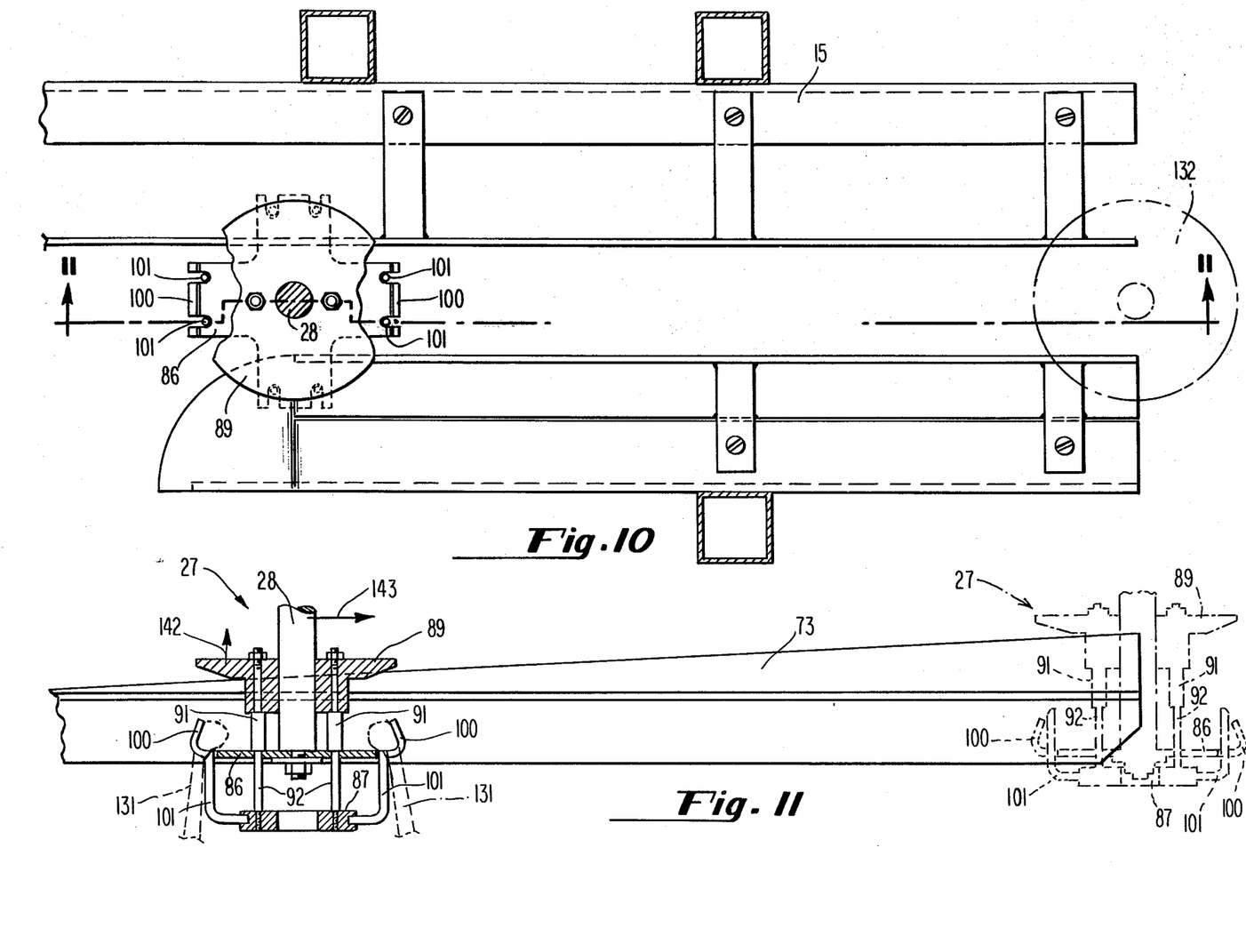
FIG. 10 is a cross-sectional view, taken along the line 10—10 of FIG. 2, and rotated 90°, showing the motion of a trolley through the section of the apparatus which automatically removes bone remnants from the poultry piece holder.
FIG. 11 is a cross-sectional view taken along the line 11—11 of FIG. 10, further illustrating the means by which skeletal remains of poultry are removed after the meat has been separated.

After the centrifugal separation has occurred, and rod 28 of trolley 27 is no longer rotating, it is necessary to remove the bones that remain attached to the trolley. This removal is accomplished automatically, as illustrated in FIG. 10 and 11. FIG. 10 illustrates the movement of a trolley along the end section of the apparatus. The hook plate 86 is shown in its initial and final positions along the end portion of the apparatus. The final position of plate 86 (and trolley 27) is indicated by the dotted circle 132 which is drawn to correspond with the phantom sketch of FIG. 11. FIG. 11, taken along the line 11—11 of FIG. 10 shows the cam action caused by incline 73. It is seen that support plate 89 is free to move in the vertical direction, as illustrated by arrow 142, at the same time that trolley 27 is moving in the direction indicated by arrow 143. As support plate 89 moves upward, said plate pulls with it bone-removing pusher prong assembly 87 and sliding post members 92. Sliding members 92 are connected to stops 91 which prevent bone-removing pusher prong assembly 87 from falling, prior to this point in the operation, but which still allow sliding members 92 to slide upward at this stage in response to the cam action of incline 73. As the trolley proceeds in the direction indicated by arrow 143, bone-removing prongs 101 are urged upward and push skeletal poultry remnants 131 upward and off hook plate 86, as suggested by the phantom sketch in FIG. 11. Skeleton remnants 131 are therefore ejected, and thereupon support plate 89 falls back to its normal position at the termination of incline 73. At this point, the trolley 27 is once again in the "input" or loading area of the apparatus, and is ready to receive fresh poultry pieces.

The operation of the preferred embodiment can now be explained more fully, with reference to FIGS. 1, 2, and 3. Although the full complement of trolleys 27 is not shown in these figures, it is understood that in the preferred embodiment, there are 24 such trolleys, located at equidistant points along track 26. The chain 48 (see FIG. 2) connecting the trolleys 27 moves continuously, such that the train of trolleys moves clockwise, as indicated by arrow 63 in FIG. 3. Operators of the apparatus stand along conveyor belt 17. Poultry pieces, either cooked or raw, travel along conveyor belt 17, and the operators of the apparatus pick up said poultry pieces from conveyor belt 17 and affix them to an appropriate hook on a trolley 27. The attachment of poultry pieces is facilitated by the automatic 90° rotation of the trolleys that occurs each time a given hook has been loaded with a poultry piece. Thus, an operator of the apparatus can be sure that a vacant and non-rotating hook will be facing outward, on which a poultry piece can be easily and quickly attached. Trolleys 27, loaded with poultry pieces, continue to travel around the end of the apparatus, around sprockets 51 and 52, and reach the area over conveyor belt 16. When trolleys 27 reach the area spanned by high-speed belt 53, said trolleys are pushed against said belt by the drive tensioner assembly 31, and the poultry pieces are spun at high velocity. The speed of rotation, as governed by motor 25, is adjusted such that meat will be separated from bone by centrifugal forces alone, whether the poultry pieces are cooked or raw. As stated above, raw poultry requires higher speeds of rotation. Trolleys 27 then pass beyond the region of high-speed belt 53, and encounter deceleration belt 58, which belt is moving at the much slower speed, corresponding to the speed of translation of the trolleys themselves. Deceleration tensioner 47 pushes trolleys 27 against belt 58, causing deceleration of the spinning elements, in such a manner that the deceleration is not too sudden. Trolleys 27 then proceed around sprocket 50, where they encounter incline 73, and where the skeletal remnants still attached to the trolleys 27, are automatically ejected, as illustrated in FIG. 11. Trolleys 27, now empty, proceed around sprocket 49, and are in position to start the entire process again.

It will be understood that the preferred embodiment described above is only one of many embodiments of the present invention. Many variations are encompassed within the scope of this disclosure and claims set forth below. For example, the number of trolleys used, and the number of loading stations are clearly variable. Differences in the design of the specific poultry holders used are also possible. The specific design of the trolleys may vary, within the scope of the invention. Also, while the poultry pieces illustrated in the drawings are leg-thigh sections, it is understood that this inventin will work with other types of poultry pieces. It is possible to spin a breast section, for example, by attaching a rotatable rod through the neck and tail cavity, and thereby to achieve centrifugal separation, also within the scope of this invention. It is therefore clear that the invention described herein is not to be deemed to be limited to the specific embodiments described above.

What is claimed is:

1. Apparatus for dry centrifugal separation of poultry meat from bone comprising means for holding at least one poultry leg-thigh section at an end thereof, motor means for imparting rotational motion to said holding means, which rotational motion may be controlled by said motor means at an acceleration rate within the range of from one to 40 radians per second per second, and means for collecting fragments of separated meat.

2. A method of dry centrifugal separation of poultry meat from bone comprising the steps of:
   (a) attaching a poultry piece to a holding means;
   (b) gradually imparting rotational motion to said holding means at speeds sufficient to cause pieces of meat to separate from bone due to centrifugal forces alone, said speeds being insufficient to cause the holding means to fracture the bone; and
   (c) collecting said pieces of meat.

3. The method of claim 2, wherein the gradual rotational acceleration is in the range of one to 40 radians per second per second.

4. A method of deboning a leg-thigh section of poultry, comprising the steps of:
   (a) separating a leg-thigh section from a poultry carcass;
   (b) attaching the end of the leg portion of said leg-thigh section to a rotatable horizontal holder;
   (c) rotating said holder at a gradually accelerating speed sufficient to cause separation of meat from bone due to centrifugal forces alone, yet insufficient to fracture said bone; and
   (d) collecting said meat after separation from said bone.

5. Apparatus for continuous, dry, centrifugal separation of poultry meat from bone comprising:
   (a) a plurality of trolleys connected together along a guide means, each of said trolleys comprising a rotatable means for holding at least one poultry section;
   (b) means for moving said trolleys continuously along said guide means;
   (c) means for imparting rotational motion to at least one of said holding means comprising an endless belt that is adapted to rub against said holding means and clutch means for delaying the acceleration of said holding means when said holding means achieve contact with said endless belt; and
   (d) automatic means for adjusting the orientation of said holding means, wherein the unloaded portion of said holding means is disposed on the outer periphery of said apparatus.

6. The apparatus of claim 5, further comprising braking means for decelerating a spinning poultry section after the meat of said second has been separated.

7. The apparatus of claim 6, further comprising a second conveyor belt, said second conveyor belt being disposed on the side of said apparatus, and said second conveyor belt being adapted to deliver poultry carcasses for loading onto said holding means.

* * * * *

UNITED STATES PATENT OFFICE
CERTIFICATE OF CORRECTION

Patent No. 4,213,229   Dated July 22, 1980

Inventor(s) Warren D. Helmer and Robert E. Small

It is certified that error appears in the above-identified patent and that said Letters Patent are hereby corrected as shown below:

Column 4, line 53 "cenfrifugal" should be --centrifugal--

Column 6, line 34 "passed" should be --pressed--

Column 10, line 29 "second" should be --section--.

Column 8, line 68 "inventin" should be --invention--.

Signed and Sealed this

Twentieth Day of January 1981

[SEAL]

Attest:

RENE D. TEGTMEYER

Attesting Officer    Acting Commissioner of Patents and Trademarks